US012234050B2

(12) United States Patent
Niehr et al.

(10) Patent No.: US 12,234,050 B2
(45) Date of Patent: Feb. 25, 2025

(54) LINEAR FILLING MACHINE FOR FILLING CONTAINERS WITH FILLING MATERIAL

(71) Applicant: KHS GMBH, Dortmund (DE)

(72) Inventors: Thomas Niehr, Bad Muenster am Stein Ebernburg (DE); Alexander Danelski, Bad Kreuznach (DE); Thorsten Mietsch, Hattingen (DE)

(73) Assignee: KHS GmbH, Dortmund (DE)

(*) Notice: Subject to any disclaimer, the term of this patent is extended or adjusted under 35 U.S.C. 154(b) by 248 days.

(21) Appl. No.: 17/775,365

(22) PCT Filed: Nov. 2, 2020

(86) PCT No.: PCT/EP2020/080646
§ 371 (c)(1),
(2) Date: May 9, 2022

(87) PCT Pub. No.: WO2021/094118
PCT Pub. Date: May 20, 2021

(65) Prior Publication Data

US 2022/0396385 A1 Dec. 15, 2022

(30) Foreign Application Priority Data

Nov. 11, 2019 (DE) ..................... 10 2019 130 364.8

(51) Int. Cl.
*B65B 59/04* (2006.01)
*B65B 55/10* (2006.01)
(Continued)

(52) U.S. Cl.
CPC .............. *B65B 59/04* (2013.01); *B65B 55/10* (2013.01); *B65B 65/003* (2013.01); *B67C 7/0026* (2013.01); *B67C 7/0073* (2013.01)

(58) Field of Classification Search
CPC ....... B65B 55/025; B65B 55/10; B65B 59/04; B67C 7/0026; B67C 7/0033; B67C 7/0073
(Continued)

(56) References Cited

U.S. PATENT DOCUMENTS 2,559,242 A * 7/1951 Boegly et al. ........ B67C 7/0033 141/180
3,613,746 A * 10/1971 Smith .................. B67C 7/0073 141/11
(Continued)

FOREIGN PATENT DOCUMENTS

CN 102020041 A 4/2011
CN 102300774 A 12/2011
(Continued)

*Primary Examiner* — Stephen F. Gerrity
(74) *Attorney, Agent, or Firm* — Laurence A. Greenberg; Werner H. Stemer; Ralph E. Locher

(57) ABSTRACT

A linear filling machine for filling containers that are transported in groups along a linear conveying path has a plurality of machine sections following one another along the conveying path. The respective machine sections form an input station for receiving the containers, a handling station for treating the containers, a filling station for filling the containers, and a discharge station for delivering the containers. The machine sections are exchangeable machine modules, wherein each machine module forms an independent functional unit with a power supply unit and a media supply unit, in particular a pneumatic medium supply unit. The supply units are arranged spatially separate from one another, with the power supply unit arranged on a first side and the pneumatic medium supply unit arranged on an opposite, second side of the machine module.

18 Claims, 5 Drawing Sheets

(51) Int. Cl.
*B65B 65/00* (2006.01)
*B67C 7/00* (2006.01)

(58) Field of Classification Search
USPC .......................................... 53/426, 167, 282
See application file for complete search history.

(56) References Cited

U.S. PATENT DOCUMENTS

| | | | | |
|---|---|---|---|---|
| 4,385,685 | A * | 5/1983 | Sticht | G05B 19/07 198/341.04 |
| 4,860,519 | A | 8/1989 | Lemaire et al. | |
| 5,792,435 | A * | 8/1998 | Mueller et al. | A61L 2/24 422/302 |
| 6,328,928 | B1 * | 12/2001 | Schroeder et al. | B65B 55/10 422/26 |
| 6,516,939 | B1 * | 2/2003 | Schmidt et al. | B67C 3/242 198/803.14 |
| 2001/0029999 | A1 * | 10/2001 | Reinecke | B67C 7/0033 141/165 |
| 2008/0256902 | A1 | 10/2008 | Lorcks et al. | |
| 2012/0031040 | A1 * | 2/2012 | Federici | B65B 59/04 53/127 |
| 2014/0137521 | A1 | 5/2014 | Niehr | |
| 2015/0197415 | A1 * | 7/2015 | Hahn et al. | B67C 7/0006 414/226.02 |
| 2018/0009609 | A1 * | 1/2018 | Frohlich et al. | B67C 7/0026 |
| 2020/0079636 | A1 * | 3/2020 | Würzbauer | B67C 3/225 |

FOREIGN PATENT DOCUMENTS

| | | | | |
|---|---|---|---|---|
| CN | 206692304 | U | 12/2017 | |
| CN | 209226564 | U | 8/2019 | |
| CN | 209411739 | U | 9/2019 | |
| DE | 10147361 | A1 | 4/2003 | |
| DE | 20313807 | U1 | 11/2003 | |
| DE | 102006006220 | A1 * | 8/2007 | B65B 65/003 |
| DE | 102011106760 | A1 | 1/2013 | |
| DE | 102013101484 | A1 | 8/2014 | |
| DE | 102016009406 | A1 * | 2/2018 | B65B 59/04 |
| DE | 102017200366 | A1 * | 7/2018 | B65B 55/025 |
| EP | 0294251 | A1 | 12/1988 | |
| EP | 1977990 | A1 | 10/2008 | |
| EP | 3533717 | A1 | 9/2019 | |
| WO | 2007090653 | A1 | 8/2007 | |
| WO | 2013155369 | A1 | 10/2013 | |

* cited by examiner

LINEAR FILLING MACHINE FOR FILLING CONTAINERS WITH FILLING MATERIAL

FIELD AND BACKGROUND OF THE INVENTION

The invention relates to a linear filling machine for filling containers with a filling material, in particular to a linear filling machine preferably operated in cyclic operation, for filling bottles, such as plastic bottles, with a beverage.

Linear filling machines are well known from the prior art. Such filling machines, operated as a rule in cyclic or stepped operation, are used, for example, in the beverage industry or in the milk processing industry for filling beverages, and in this situation are frequently configured as aseptic fillers for the sterile filling of containers, in particular bottles. Exemplary embodiments of the type referred to are described, for example, in DE 10 2011 106 760 A1 or EP 1 977 990 A1.

In this situation, the principle is known of moving the containers, cyclically or in cycles, on a transport or conveying path through a linear filling machine, for example by means of what are known as linear transporters, in which the bottles are held suspended, and in the process carrying out the different conveying and treatment steps in respective sequential machine stations or machine sections. The transport and handling take place in this situation in most cases in groups, wherein the containers of a container group being held suspended in a receiver device, in particular a carrying strip, of the linear transporter are moved in parallel lines and are treated together as a group in the individual machine stations or machine sections of the linear filling machine. In this situation, the principle is also known of corresponding devices for the individual treatment steps being arranged in the respective sequential machine stations or machine sections, by means of which the containers being moved through the linear filling machine are treated or processed as a container group.

In particular in the case of a linear filling machine configured as an aseptic filler, the containers are taken over by corresponding takeover or inlet devices, and the still empty containers introduced in this way into the aseptic filler are, for example, first sterilised by means of a sterilisation device, namely by means of a device for treatment with sterilisation medium, such as with a sterilisation medium containing $H_2O_2$. Next, the containers are filled by means of a filling device with the liquid product or filling material, and then closed by means of a closure device, then discharged from the linear filling machine by means of a handover or outlet device. Depending on the application situation, it is possible, during the filling of the product, for further testing and/or processing steps, such as the imposition of $N_2$ or of gas containing $N_2$, aerosols, or similar treatments, wherein corresponding treatment stations for such treatments can be integrated in the application-specific linear filling machines at the corresponding location.

The linear filling machines known from the prior art are relatively inflexible or predefined in respect of their structural design, in particular of their overall arrangement and their overall structure, with the result that the known linear filling machines may indeed be suitable or optimised for specific application processes, but, disadvantageously, it is not possible, or only with very great effort, to re-equip them for a particular application. A correspondingly flexible adaptation to changed or changing application processes with known linear filling machines is therefore only possible with substantial technical effort.

The possibility of flexible adaptation or re-equipping is, however, increasingly desirable, in particular due to the fact that, for example in the beverage industry or milk processing industry, in particular in the sector of beverage filling, the intention is for new types of products to be brought onto the market in ever shortening cycles, although this is also frequently associated with necessary adjustments and modifications in the filling process. For example, depending on the product which is to be filled, it may be necessary to switch or extend to a fully aseptic form of filling. Different types of beverage mixtures also require, for example, special additional treatment steps during the filling process, or different types of machine stations for closing are required for new types and different forms of containers or packaging. Accordingly, there continues to be a need for improved linear filling machines.

SUMMARY OF THE INVENTION

The object of the invention is to provide a linear filling machine which avoids the disadvantages of the solutions known from the prior art, and, with a structurally simple design, allows for an improved and more flexible adaptation to production processes, as well as easy capacity for conversion and retrofitting.

To solve this object, a linear filling machine is configured in accordance with the features as claimed. Furthermore, to solve the object a machine module for use in a linear filling machine is provided in accordance with the claims. Advantageous further embodiments of the invention are provided in the dependent claims. In this situation, all the features described are in principle the object of the invention, alone or in any desired combination, regardless of their association in the claims or reference to them. The contents of the claims are also deemed to be a constituent part of the description.

The present invention provides a linear filling machine for filling a filling product into containers which are being transported along a linear conveying path. The linear filling machine comprises several machine sections following one another along the conveying path, wherein the respective machine sections form at least one inlet station for taking over the containers, a treatment station for treating the containers, a filling station for filling the containers, and an outlet station for handing over the containers. The linear filling machine is characterised in particular in that the machine sections are configured as replaceable machine modules, wherein each machine module forms an independent function unit, and for this purpose comprises at least one electric supply unit, comprising, for example, an instrumentation, control, and securing device, as well as at least one media supply unit, in particular a pneumatic supply unit. The electric supply unit and the pneumatic supply unit are arranged spatially separated from one another. In this situation, the electric supply unit is arranged on a first side, and the pneumatic supply unit is arranged on an opposing second side of the machine module.

An "electric supply unit" in the meaning of the present invention is to be understood as the "electrics" or electrical main supply hardware known to the person skilled in the art and necessary for the main supply of a machine section. This includes, in the present case, main connections and hardware components for the provision, wiring, and supply of a machine module with electric current, as well as for data transfer. Included in particular are main or basic components of supply, distribution, and interface elements, with the corresponding hardware components. By analogy with this, a "pneumatic supply unit" in the meaning of the invention is understood to be the "pneumatics" or the main supply hardware for the pneumatic supply of the machine section, known to the person skilled in the art and necessary for the main supply of a machine section, but in particular also for the supply of the machine section with other supply media. Here too, by analogy, the term also includes all the main connections and hardware components for the provision, connections, and supply of a machine module with pneumatically effective media or other supply media.

Cables and lines branching off from the electric supply unit, in particular the branching cables and lines designated in the present case as "electrical distribution lines", can in this situation also be understood as part of the overall electric supply unit. By analogy with this, the lines branching from the pneumatic supply unit, in particular the branching lines designated in the present case as "pneumatic distribution lines", can also be understood as part of the overall electric supply unit.

Particularly advantageously, due to the spatial separation of the electric supply and the pneumatic supply unit, in each machine module an electric side and a pneumatic side are formed. As a result, on the one hand the possibilities of advance installation in the individual departments are improved, and, on the other, the function tests are rendered easier.

It is likewise advantageous for each machine module that it is formed as an independent unit, in particular as an independent function unit, and each machine module, considered individually, is equipped with all the hardware required for electrical and pneumatic supply, and can be taken into operation with a central or actuating unit. Each machine module can therefore also be tested for its function individually, i.e. also outside the completely assembled and configured filling machine. As a result, early fault recognition is advantageously provided, since function tests can already be carried out module by module, i.e. for the individual machine modules, and, specifically and in particular, also complete function tests, before the actual taking into operation of the entire ready configured filling machine.

Several machine modules coupled to one another in a functional manner then together form the linear filling machine, in particular in the form of an aseptic filler. Since the machine modules are configured as exchangeable machine modules, there are no strict configuration provisions for an initial assembly and coupling. Particularly advantageous is the fact that a subsequent rearrangement of the machine modules is possible in a particularly simple and rapid manner, and even a subsequent integration of additional machine modules. This accordingly provides a simple and rapid possibility and solution or retrofitting of the linear filling machine. The present linear filling machine can therefore be configured as flexible. In particular, due to the strict spatial separation of the electric and pneumatic side, the assembly and coupling of the individual machine modules is particularly easy.

The present linear filling machine also makes it possible, in an easy manner, for machine modules, and therefore individual stations or function units, to be replaced. For example, a machine module related to a specific application, which forms a closure station for applying sealing films, can be rapidly and easily replaced by another machine module, which forms a closure station for closing the containers with screw cover closures. Likewise advantageously, by simple addition or retrofitting of a machine module which forms a sterilising station, a non-aseptic or only partially aseptic filling machine can be extended to a fully aseptic filling machine.

Preferably, the machine modules are coupled to one another in an exchangeable manner, and are connected for control and operation in a central or actuation unit provided. In this situation, the electric supply units of all the machine modules are arranged in the region of a first side of the linear filling machine extending along the conveying path, and the pneumatic supply units of all the machine modules are arranged along an opposite second side of the linear filling machine. As a result of this arrangement of the machine modules, an electric side and a pneumatic side are defined for the entire linear filling machine. This provides substantial advantages for upkeep and maintenance, but also in the event of repairs being required and in the event of specific needs and applications, or the converting or retrofitting of the linear filling machine, since the accessibility of the electrical and pneumatic equipment, as well as the overview, are improved for the technical personnel. Moreover, the cable paths are laid in the shortest lengths possible in the $H_2O_2$ zone. The central or actuating unit can comprise a central supply, such as a switch cabinet and a central control unit. The central or actuating unit can also comprise a storage tank, a container inlet, as well as data connections and the like.

According to one preferred embodiment of the invention, each machine module comprises an inlet end and an opposite outlet end, wherein the inlet end and/or the outlet end is configured as a coupling section for the functional connection to adjacently arranged machine modules. It is self-explanatory in this situation that, with a machine module arranged on the inlet side and arranged foremost in the direction of the conveyor path, it is sufficient for the outlet end to be configured as a coupling section. Conversely, with a machine module arranged on the outlet side, and arranged as last in the direction of the conveyor path, it is sufficient for the inlet end to be configured as a coupling section. With all the "internal" machine modules, which in each case are arranged between two further machine modules, both the inlet end and the outlet end are configured as coupling sections. Two adjacent machine modules, following one another along the conveyor path, namely in the conveying direction, are therefore coupled by way of the outlet end of machine module preceding in the conveying direction, and by way of the inlet end of the machine module following in the conveying direction. For the person skilled in the art it is self-explanatory that the functional coupling of the individual independent machine modules, forming a complete function unit, is of such a nature that, for example, the cyclic onwards transport of the containers away over the coupling points, namely from one machine module to the adjacent connecting and coupled machine module takes place unhindered.

Preferably, a respective treatment and function device is arranged in an interior space of the machine module. Such a treatment and function device can be, for example, a device for taking over or handing over the containers, in particular with a sterilisation medium or with a stabilising medium, or a device for filling the containers with a filling material or a device for closing the containers. A respective treatment and function device arranged in the interior of a machine module is connected in this situation by means of at least one electric distribution line to the electric supply unit. As an alternative or in addition to this, the respective treatment and function device arranged in the interior of a machine module is connected by means of the at least one pneumatic distribution line to the pneumatic supply unit.

The collective terms used here, "electric distribution line" and "pneumatic distribution line", include all the lines and line sections which run between the connection location or connection of the treatment and function device, namely the place of use and the respective supply unit. All electric lines or data lines, such as connection cables and other cables, in particular power cables and data cables, as well as all the lines forming part of the instrumentation, control, and safety device, which run between the connection of the treatment and function device and the hardware present in the supply unit, in particular the main supply unit with the corresponding main distributor hardware and interface hardware, are therefore elements of the "electric distributor line" in the meaning of the invention. Analogously to this, all the line sections of pneumatic lines, or of lines of other supply media, which lie between the connection of the treatment and function device and the hardware present in the supply unit, are elements or parts of the "pneumatic distributor line".

The "electric distributor line" can also be understood in this situation to be part of the entire electric supply unit. By analogy with this, the "pneumatic distributor line" can also be understood to be a part of the entire electric supply unit.

For particular preference, each machine module comprise a module frame, wherein the module frame comprises at least one vertical carrier column arranged on the first side of the machine module, and at least one vertical carrier column arranged on the second side of the machine module, and wherein the module frame further comprises at least one horizontal carrier spar extending along the first side and a second horizontal carrier spar extending along the second side.

Preferably, in each case two or more vertical carrier columns are arranged on each side, wherein the several vertical carrier columns on a side are, for particular preference, arranged distributed over the entire longitudinal extension of the side, in particular at uniform distance intervals from one another. The horizontal carrier spars are preferably arranged on the upper side in the machine module, and, in particular define an upper side of the module frame.

According to one advantageous embodiment of the invention, the at least one vertical carrier column of the first side is configured so as to receive, at least in sections, and guide the electric distributor line, and the electric distributor line is received and guided, at least in sections, in the vertical carrier column of the first side. As an alternative or in addition to this, the at least one vertical carrier column of the second side is configured to receiving and guiding, at least in sections, the pneumatic distributor line, and the pneumatic distributor line is received and guided at least in sections in the vertical carrier column of the second side.

For particular preference, in this situation the vertical carrier columns are configured in the form of tubes, for example in the form of quadrilateral tubes.

Preferably, the horizontal carrier spar of the first side is configured for the at least partial receiving and guiding of the electric supply unit, and forms an electric main channel. Likewise preferably, the horizontal carrier spar of the second side is configured for at least partly receiving and guiding the pneumatic supply unit, and forms a pneumatic main channel. In these preferred embodiment forms, the main connections and hardware, in particular the main supply units with the corresponding main distributor and interface hardware components are located and received in the respective main channels. The corresponding main channels, namely the electric main channel and the pneumatic main channel, are preferably provided in this situation with main supply connections, by means of which a function test can be carried out.

According to alternative possible embodiments, each machine module can also comprise at least one tubular main channel body, extending longitudinally and along the conveying direction, for the at least partial receiving of the electric supply unit or the pneumatic supply unit, wherein the main channel body is held in a load-bearing manner by one of the horizontal carrier spars. It is of course also possible for two main channel bodies to be provided, wherein, in each case, one of the two main channel bodies is held or carried in each case by one carrier spar. In these variants, therefore, the main channel body being carried by the carrier spar of the first side forms the electric main channel, and the main channel body being carried by the carrier spar of the second side forms the pneumatic main channel. Advantageously, in this situation the main channel body can be arranged, for example, above the carrier spars, resting on them, as a result of which access is improved. In this situation, too, the main channel body is configured as enlarged in comparison with the carrier spars, as a result of which spatial advantages are obtained for the receiving of the supply units.

Particular advantages are derived if the electric and/or pneumatic distributor line is guided at least in sections in the vertical carrier column located closest to a corresponding connection of the treatment and function device, and, coming from this, is connected to the connection of the treatment and function device, since by means of this, on the one hand, the effect can be achieved that, for laying lines or cabling inside the machine module, it is always possible to select the shortest paths, as a result of which a saving of material can advantageously be achieved. In addition to this, the advantage is also obtained that the corresponding distributor lines, namely, in particular, the cables and pneumatic lines, are conveyed to the connection as far as possible in the guided and received state, namely in the reception space of the carrier columns, and therefore inside the protected environment of the receiving and guiding carrier column.

In particular, the electric and/or pneumatic distributor line is received and guided in the vertical carrier column in such a way that the distributor line runs on the shortest possible path freely through the interior of the machine module as far as a connection of the treatment and function device.

For example, provided in the carrier columns are corresponding outlet points or passage points or regions, preferably sealed, for the outlet or passage or for the emergence or passing of the cables and lines out of the receiving space of the carrier column into the free interior of the machine module, wherein the cables or lines are guided out of the reception space of the carrier column at a respective emergence point or passage point closest to the connection of the treatment and function device, and are led to the connection. As a result, it can additionally be ensured, for example, that the corresponding distributor lines, namely and in particular the cables and pneumatic lines extend only over the shortest possible path freely and unprotected through the interior or through the free space in the interior of the machine module, in particular through the aseptic space. This provides the special advantage of safeguarding of the product, since the corresponding cables and lines are not subjected over any long or extended stretch sections or longitudinal sections to the partially harsh conditions, damaging to the product, of the atmosphere of the aseptic space, enriched with $H_2O_2$ and, in particular, also hot.

For particular preference, the electric and/or pneumatic distributor lines are laid in this situation in such a way that respective linear running longitudinal sections connect to one another at right angles. As a result of this, on the one hand the advantageous effect described heretofore of the longitudinal sections of the cables and lines being kept as short as possible, extending freely and unprotected through the interior, is further reinforced. At the same time, an easily overviewed and systematically ordered line laying and cabling arrangement is ensured in the entire machine module. As a result, for example, upkeep, maintenance, and repair work are facilitated, and function tests are simplified.

Preferably, provided on the upper side of the machine modules is a valve manifold for the introduction of filling material or product or treatment medium. In particular, with the machine modules serving as treatment stations or filling stations, the introduction of the filling material or product or treatment medium can take place from the top, as a result of which a product side is defined on the upper side of the machine module.

For particular preference, further machine modules can be provided on the linear filling machine. In particular, a machine module with a closure device for closing the containers can be integrated, and for particular preference between the two machine modules which serve as the filling station and as transfer station.

The invention also relates to a machine module for use in a linear filling machine. The machine module forms an independent function unit, and comprises at least one electric supply unit as well as at least one media supply unit, in particular a pneumatic supply unit. The electric supply unit and the pneumatic supply unit are arranged spatially separated from one another, wherein the electric supply unit is arranged is arranged on a first side and the pneumatic supply unit is arranged on an opposite second side of the machine module.

BRIEF DESCRIPTION OF THE FIGURES

The invention is explained in greater detail hereinafter on the basis of the Figures in relation to exemplary embodiments. The Figures show.

DETAILED DESCRIPTION OF THE INVENTION

Figure 1:
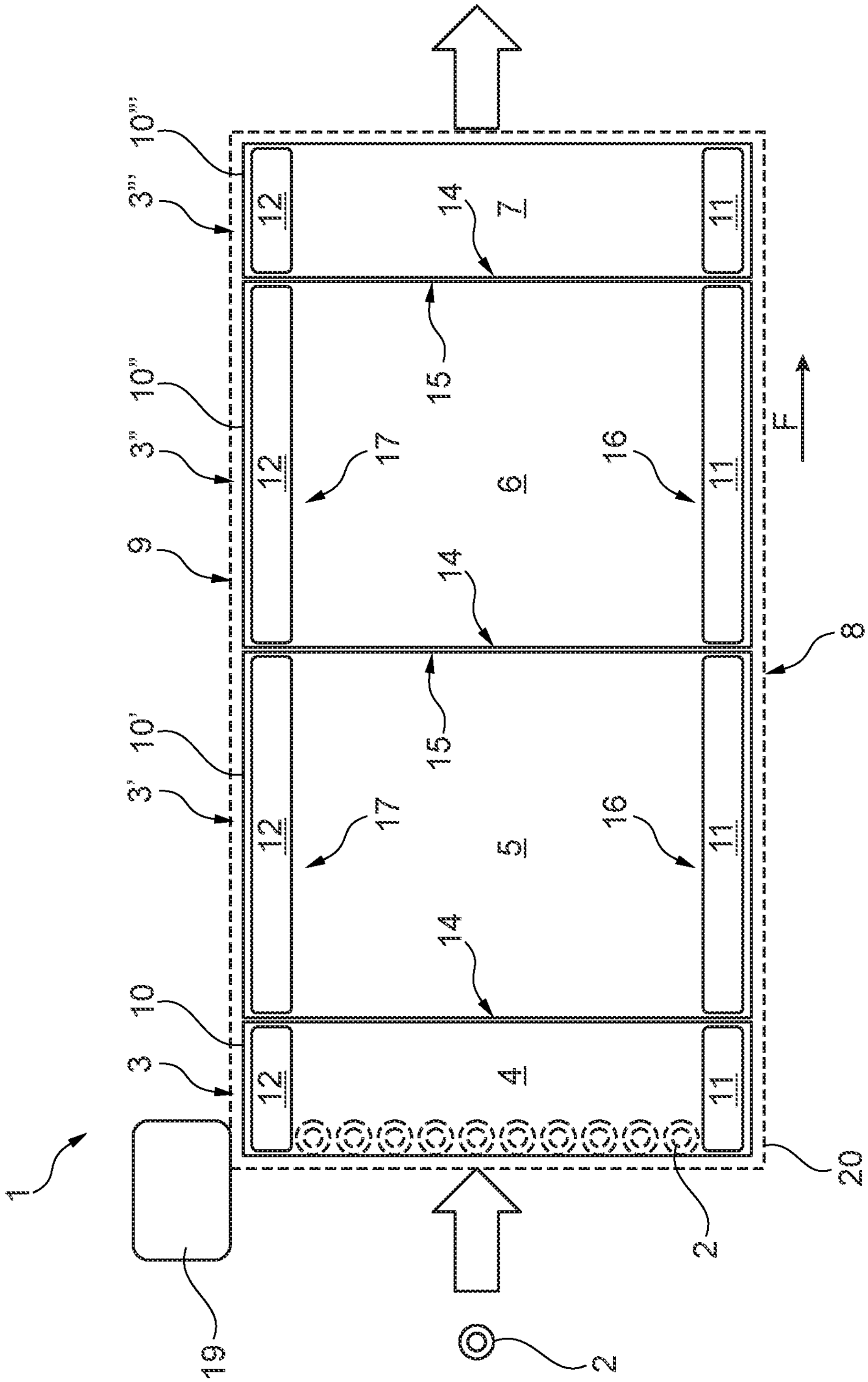
FIG. 1 In a highly simplified schematic representation and in a view from above, an embodiment of a linear filling machine according to the invention.

The linear filling machine, designated in FIG. 1 in general by 1, for filling containers 2, being transported along a conveying path F, with a filling material, is configured in the example represented in particular as a linear aseptic filler or as an aseptic linear filling system, and serves to carry out sterile filling of containers 2 with liquid product, in particular the filling of bottles, such as PET bottles, with a beverage. Such linear filling machines 1 are used in particular in the beverage industry or for the filling of beverages containing milk or dairy products, and operate as a rule in stepping operation, wherein the containers 2, being transported in groups, are moved cyclically along the conveyor path F.

The linear filling machine 1, which is shown in a view from above in the highly simplified representation of the example from FIG. 1, comprises four machine sections 3, 3', 3'', 3''', connecting to one another along the conveying path F, wherein each section forms a specific machine station with a predefined function.

The containers 2, delivered by means of a delivery unit, not represented (indicated only by an arrow) and not specified in any greater detail, first pass to the machine section 3, arranged on the inlet side, which forms an introduction station 4 for taking over the containers 2. In this situation the containers 2 are arranged in parallel lines in a container group for a cyclic multi-track further transport, which are represented in the example in FIG. 1 by a broken line, and comprises the number of ten containers 2. The container group is then transported onwards, going from the introduction station 4. For this purpose, for example, a linear receiver device is provided, configured in a known manner and with several container receivers for suspended carrying of the containers 2, wherein the containers 2 are held by means of the receiver device as a container group, positioned accordingly, and also transported further in a cyclic manner in parallel lines along the conveyor path F.

In the direction of the conveyor path F, the machine section 3 is then followed by the machine section 3', which forms a treatment station 5 for treating the containers 2, in the example represented a sterilising station for sterilising the containers 2 with a sterilising medium, such as a sterilising medium containing $H_2O_2$. The machine section 3' can therefore also be understood in the present situation as being a sterilisation section or steriliser, and comprises a sterilisation device, known to the person skilled in the art, with several treatment positions arranged next to one another in a row transverse to the conveying path F, at which the containers 2 of a container group are sterilised together and simultaneously during an operational cycle.

In particular, in this situation an aseptic space or aseptic zone or sterile space is formed in the machine section 3', in which a sterile or aseptic atmosphere is established and maintained. This aseptic space is preferably formed in a space above an upper side of the receiver device for the suspended holding of the containers 2, such that the suspended containers 2 project into the aseptic space with their neck part projecting upwards, over the upper side of the receiver device, and adjacent to the filling opening.

Further in the direction of the conveying path F, next to the machine section 3', is the machine section 3'', which forms a filling station 6 for the aseptic filling of the containers 2 with a liquid filling material or product, in particular with a beverage. The machine section 3'' can therefore also be understood in the present situation as a filling section or filler, or, in particular as an aseptic filler, and comprises a filling device known to the person skilled in the art, with several filling positions arranged next to one another in a row transverse to the conveying path F, at which the containers 2 of a container group are filled together and simultaneously during an operational cycle. The aseptic space S is also formed in the machine section 3'' (see FIGS. 2 to 5), such that aseptic conditions also prevail here.

With the exemplary embodiment represented, the machine section 3'' is followed further in the direction of the conveyor path F by the machine section 3''', forming an outlet station 7 for handing over the containers 2, which is arranged on the outlet side. By way of the outlet station 7, the containers 2 are transferred in a known manner, for example, from a machine outlet to a removal conveyor device, not represented (indicated only by an arrow) and not specified in any greater detail, from which the containers 2 are transported onwards to downstream transport units or to downstream machines for further treatment, for example for labelling, or can be conveyed for the shrink-wrapping of sleeves.

It is self-explanatory that the linear filling machine 1 can comprise further machine sections, and in particular, for example, provision is made for a further machine section to be provided between the machine sections 3'', 3''', which forms a closing station for closing the containers 2.

It is of course also possible, however, for a closure device to be arranged in immediate connection to the filling device in the machine section 3'', such that the machine section 3'' forms a filling and closing station.

The individual machine sections 3, 3', 3'', 3''' of the linear filling machine 1 are configured as exchangeable machine modules 10, 10', 10'', 10''', wherein each machine module 10, 10', 10'', 10''' forms an independent function unit. The machine modules 10, 10', 10'', 10''' are coupled to one another in an exchangeable or replaceable manner, and for operation are connected to a central or actuation unit 19, 20 provided. In the example represented, the central or actuation unit 19, 20 is configured as several part units, wherein a central or actuation unit 19, 20 can comprise a switch cabinet, a central control unit, a central main supply unit, and, for example, also a storage tank, a container inlet, or the like.

Each machine module 10, 10', 10'', 10''' comprises an inlet end 14 and an opposite outlet end 15, wherein the individual machine modules 10, 10', 10'', 10''' connect to one another by way of their respective inlet and outlet ends 14, 15. In this situation, the inlet and outlet ends 14, 15 are configured as respective coupling sections 10, 10', 10'', 10''', arranged adjacent for functional connection. Running opposite and in the direction of the conveyor path F, at the machine modules 10, 10', 10'', 10''', are in each case a first and a second side 16, 17, wherein the machine modules 10, 10', 10'', 10''' are coupled or connected to one another in such a way that the respective first sides 16 connect to one another along a first side 8 of the linear filling machine 1, and the respective second sides 17 connect to one another along a second side 9 of the linear filling machine 1.

The machine modules 10, 10', 10'', 10''' are in this situation either used individually or assembled to form a full function unit, and can also be taken into operation individually.

Each machine module 10, 10', 10'', 10''' also comprises at least one electric supply unit 11, as well as at least one pneumatic supply unit 12. The electric supply unit 11 and the pneumatic supply unit 12 are arranged spatially separated from one another, wherein the electric supply unit 11 is arranged on the first side 16 of the machine module 10, 10', 10'', 10''', and the pneumatic supply unit 12 is arranged on the opposite second side 17. Accordingly, with each machine module 10, 10', 10'', 10''', and in consequence also with the entire linear filling machine 1, an electric side E and a pneumatic side P are defined, as is shown on the basis of the schematic representation in FIG. 2 in relation to the example of a machine module 3'' configured as a filling station 6, and which will be explained in greater detail hereinafter.

In the present example in FIG. 1, the first side 16 of the machine module 10, 10', 10'', 10''', and therefore also the first page 8 of the linear filling machine 1, represents the electric side E. The second side 17 of the machine module 10, 10', 10'', 10''', opposite in relation to the conveying path F, and therefore also the second side 9 of the linear filling machine 1 represents the pneumatic side P.

Figure 2:
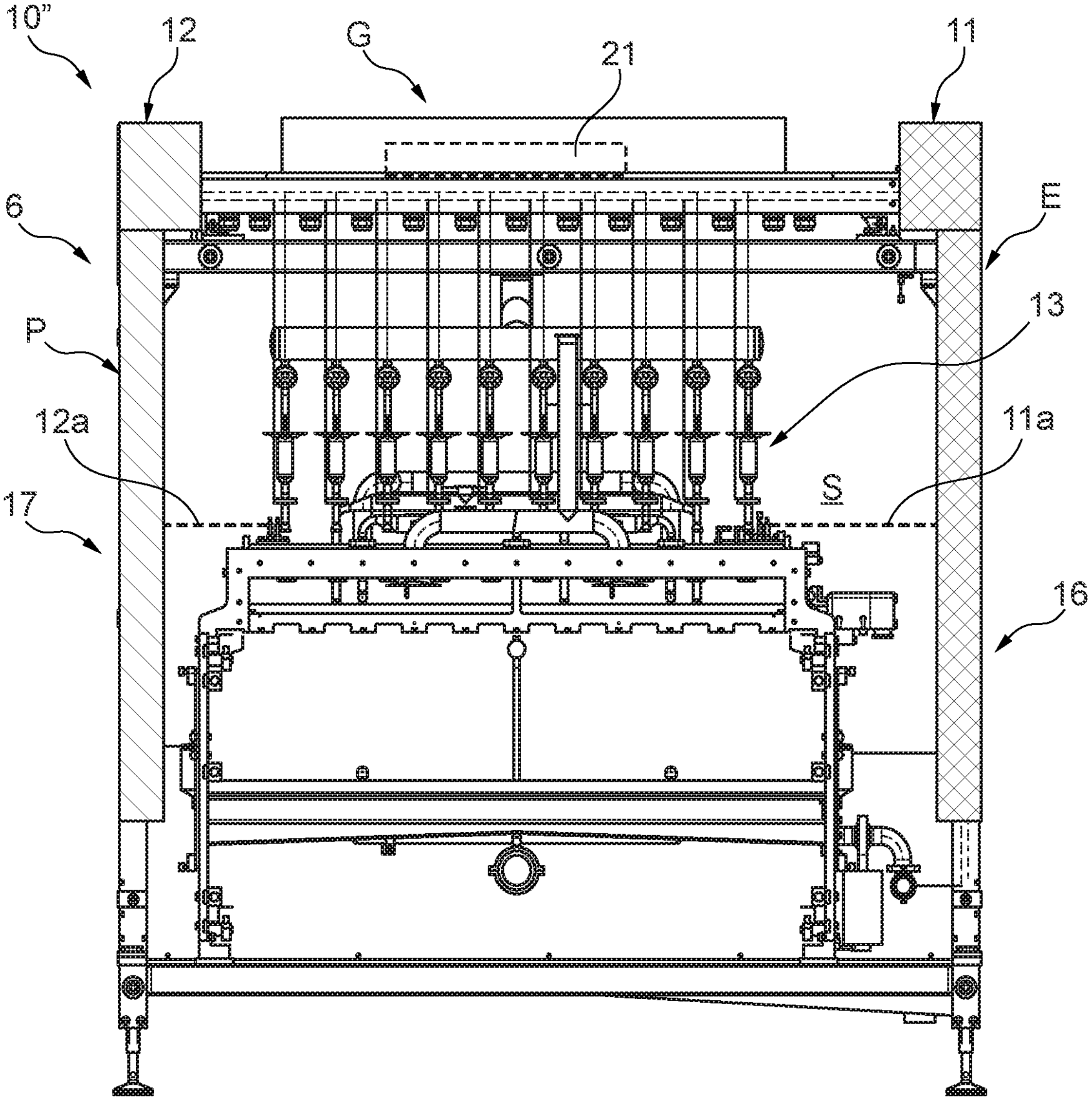
FIG. 2 in a schematic representation, a machine module, configured as a filling station, in a view on the inlet side, with emphasis on the spatial separation of an electric side and pneumatic side.
Figure 3:
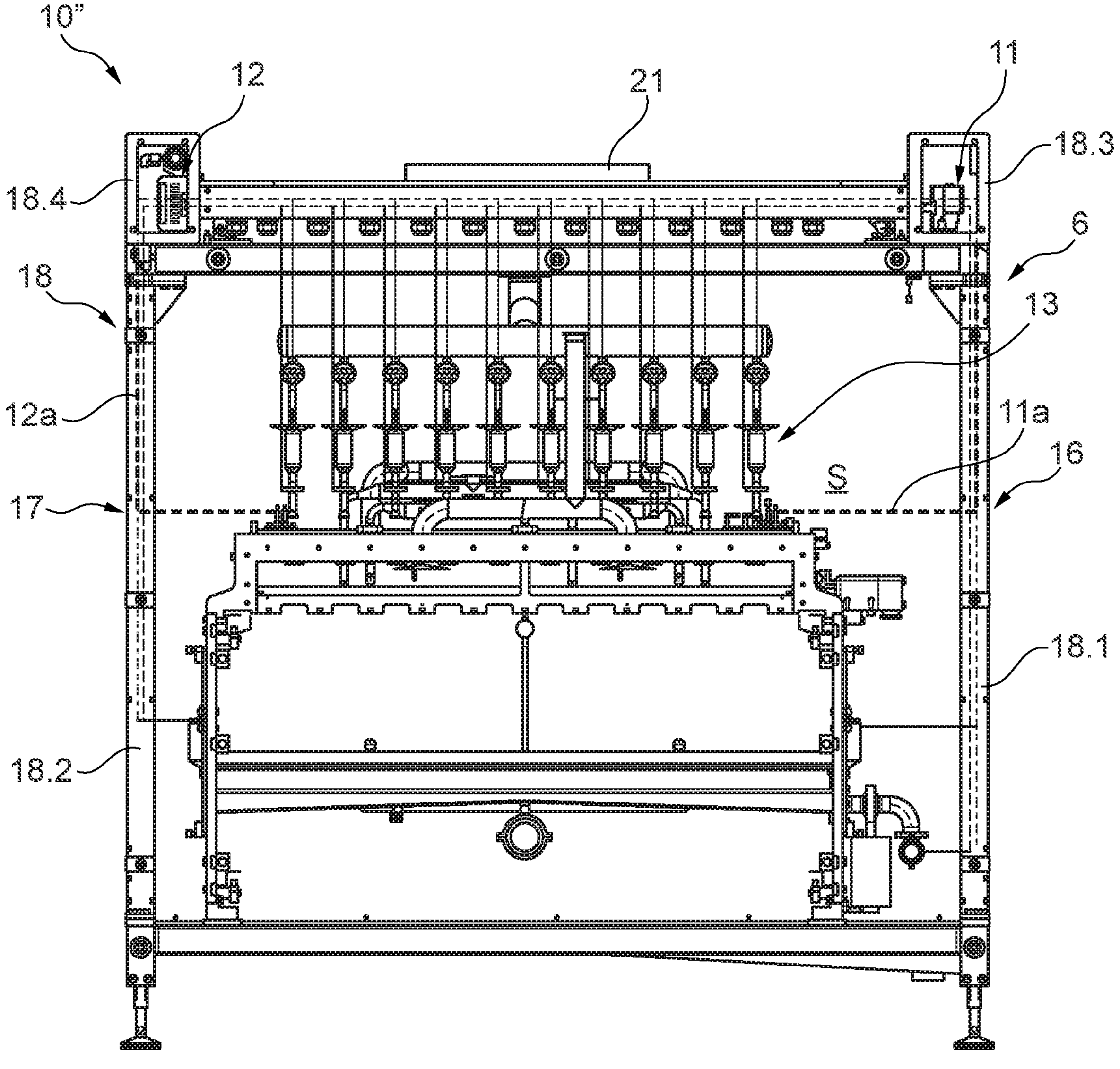
FIG. 3 a machine module configured as a filling station, in a view on the inlet side.
Figure 4:
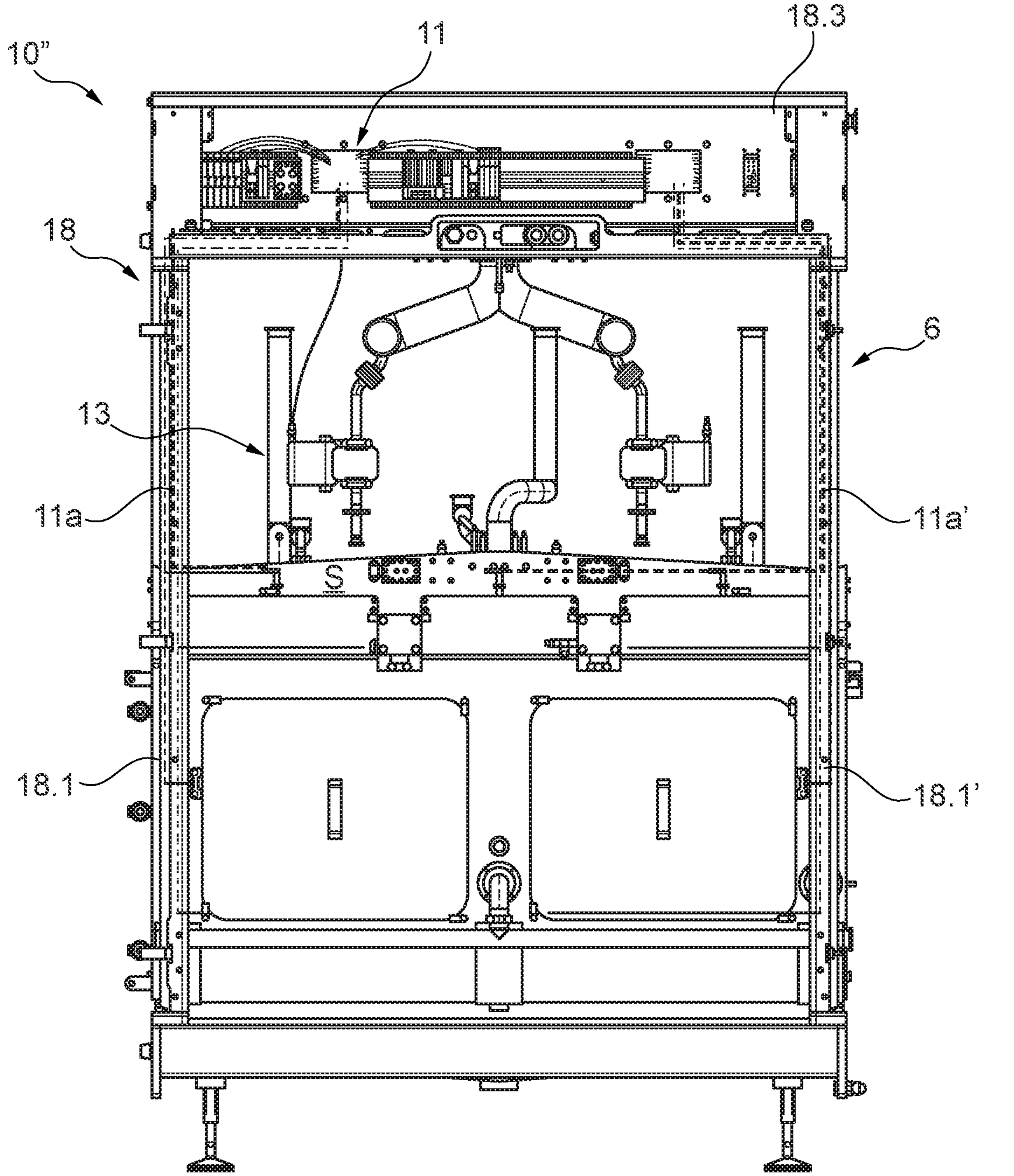
FIG. 4 the machine module from FIG. 3 in a side view of the first side, and FIG. 5 the machine module of FIG. 3 in a side view of the second side.

Represented in FIGS. 2 to 4, by way of example, is a machine module 10'', which forms a filling station 6, and in an interior space of the machine module 10'' is provided with a corresponding treatment and function device 13, in this specific case a filling device, and specifically fully functional. The filling device 13 is a filling device 13 known to the person skilled in the art, which is to be supplied in a known manner by way of electric lines and/or media lines, in particular pneumatic lines, namely by way of electric or pneumatic distributor lines 11*a*, 12*a*, and for this purpose comprises corresponding connections, in particular inlet connections, by means of which the supplying electrical and pneumatic distributor lines 11*a*, 12*a*, are connected. The electrical and pneumatic distributor lines 11*a*, 12*a* are in this situation also simply designated as cables or cabling, or as data cables or as pneumatic lines.

In at least the region of the interior space above the upper side of the receiver device for holding the containers 2, namely in the position at which, when in operation, the filling openings of suspended containers 2 with the adjacent neck part are located, the aseptic space S is formed, in particular in the form of an aseptic space S with an atmosphere containing $H_2O_2$ or an $H_2O_2$ environment.

Figure 5:
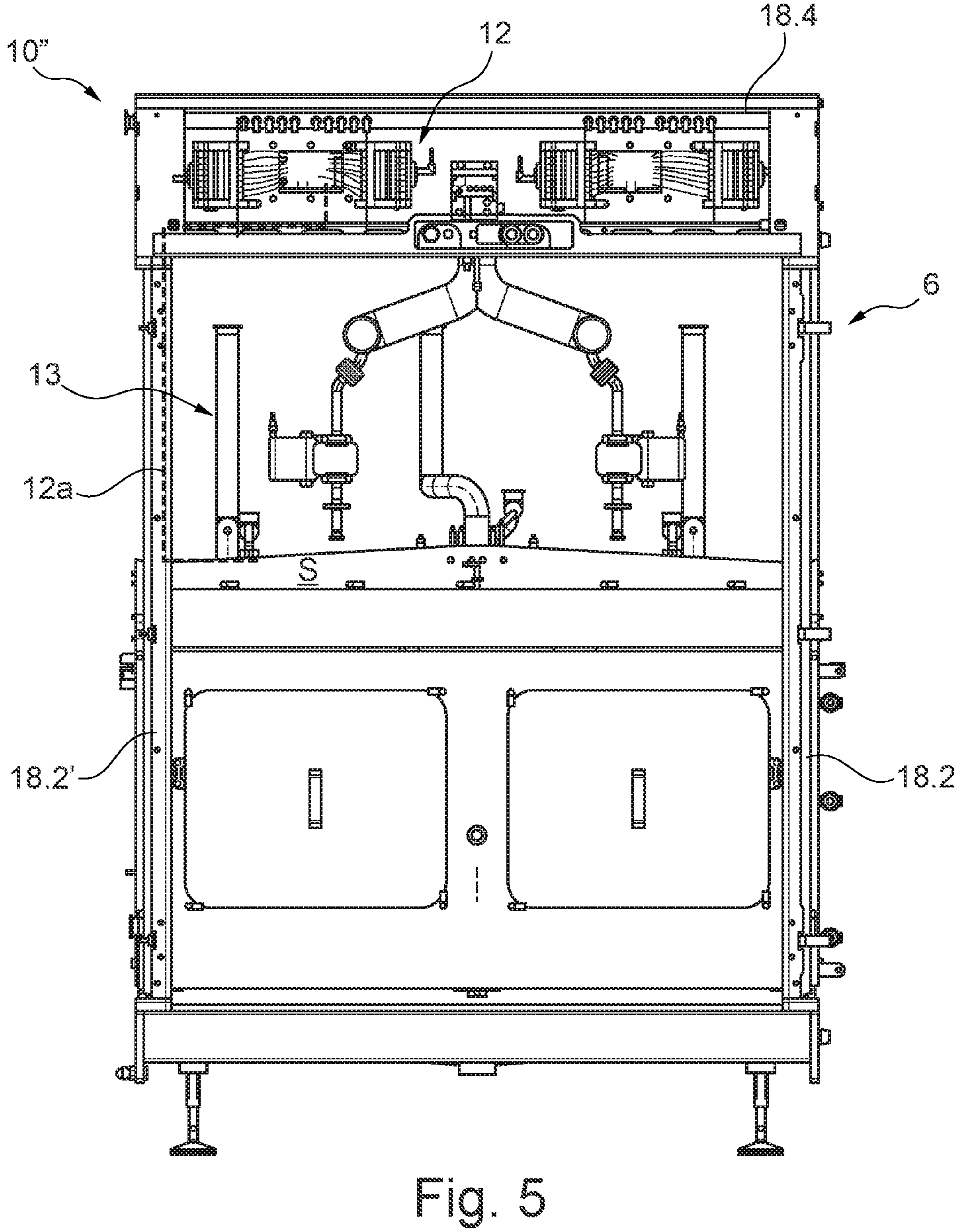

FIGS. 2 and 3 show the machine module 10'', in this situation in a view in a direction of the conveying path F, namely a view of the inlet end 14. The FIGS. 4 and 5 show in each case side views, and specifically FIG. 4 shows a view of the first side 16, which corresponds to the electric side E, and FIG. 5 shows a view of the second side 17, which corresponds to the pneumatic side P.

In FIG. 2, the spatial separation between the electric side E and the pneumatic side P is emphasised by corresponding markings. In this situation the electric side E is indicated by cross-hatching and the pneumatic side P by simple hatching. The machine module 10'' shown as example is further provided on its upper side with a valve manifold 21 for supplying the filling material, such that, in addition to the separately arranged electric and pneumatic sides E, P, a product side G is also defined (indicated by non-hatched boxes), which in turn are present in the spatial separation of the electric and pneumatic sides E, P.

The machine module 10' represented in FIGS. 2 to 5 comprises a module frame 18, which comprises vertical carrier columns 18.1, 18.1' arranged on the first side 16, and vertical carrier columns 18.2, 18.2' arranged on the second side 17. The module frame 18 further comprises a horizontal carrier spar 18.3, extending along the first side 16, and a horizontal carrier spar 18.4 extending along the second side 17, wherein the horizontal carrier spars 18.3, 18.4 of the example represented are formed for the at least partial receiving and guiding of the electric supply unit 11 or the pneumatic unit 12 respectively, and form an electric main channel or a pneumatic main channel respectively.

The vertical carrier columns 18.1, 18.1' of the first side 16 are configured as quadrilateral tubes for the partial receiving and guiding of the electric distribution lines 11*a*, 11*a'*. By analogy with this, the vertical carrier columns 18.2, 18.2' of the second side 17 are likewise configured as quadrilateral tubes for the partial receiving and guiding of the pneumatic distribution line 12*a*.

The filling device 13 is connected to the electric supply unit 11 by electric distributor lines 11*a*, 11*a'*. In this situation, the electric distributor lines 11*a*, 11*a'* are guided in particular in such a way that only the shortest possible line sections, namely line sections of the shortest possible length, extend freely in the interior, in particular through the aseptic space S. In other words, the electric distributor lines 11*a*, 11*a*' are guided on the shortest possible path, or, respectively, over the longest possible stretches in the vertical carrier columns 18.1, 18.2. The supply of the filling device 13 takes place in this situation via cables 11*a*, which are guided in the carrier column 18.1, 18.1' which are closest to the respective connection of the filling device 13, and emerge at an appropriate point form the carrier column 18.1, 18.1', in order that, coming from there, they extend freely through the interior, in particular the aseptic space S, by the shortest path as far as the connection.

As can be derived from FIG. 3, in this situation the electric distributor lines 11*a*, 11*a*' are in particular guided and laid in such a way that individual line sections or stretch sections running in linear fashion are preferably connected to one another at right angles.

By analogy, the guiding and laying of the pneumatic distributor lines 12*a* from the pneumatic side P is carried out in a corresponding manner as described heretofore for the electric side.

| Reference Number List | |
|---|---|
| 1 | Linear filling machine |
| 2 | Containers |
| 3, 3', 3'', 3''' | Machine sections |
| 4 | Inlet station |
| 5 | Treatment station |
| 6 | Filling station |
| 7 | Outlet station |
| 8, 9 | First and second side respectively of the linear filling machine |
| 10, 10', 10'', 10''' | Machine modules |
| 11 | Electric supply unit |
| 11a | Electric distributor line |
| 12 | Pneumatic supply unit |
| 12a | Pneumatic distributor line |
| 13 | Filling device |
| 14 | Inlet end |
| 15 | Outlet end |
| 16, 17 | First and second sides respectively of the machine module |
| 18 | Module frame |
| 18.1, 18.1' | Vertical carrier column |
| 18.2, 18.2' | Vertical carrier column |
| 18.3, 18.4 | Horizontal carrier spar |
| 19, 20 | Central or actuation unit |
| 21 | Valve manifold |
| E | Electric side |
| F | Conveying path |
| G | Product side |
| P | Pneumatic side |
| S | Aseptic space |

The invention claimed is:

1. A linear filling machine for filling containers with a filling product, wherein the containers are transported in groups along a linear conveying path, the filling machine comprising:

a plurality of machine sections following one another along the conveying path, said machine sections including at least one inlet station-receiving the containers, a treatment station for treating the containers, a filling station for filling the containers, and an outlet station for delivering the containers;

said machine sections being configured as exchangeable machine modules and each of said machine modules forming an independent function unit being configured to be taken into full operation individually, with each of said machine modules having at least one electric supply unit and at least one media supply unit;

each said machine module having an inlet end and an opposing outlet end, and at least one of said inlet end or said outlet end being a coupling section for a functional connection of an adjacent said machine modules, and said coupling section being configured for unhindered onward transport of the containers over said coupling section;

said electric supply unit and said media supply unit being disposed spatially separate from one another, with said electric supply unit being arranged on a first side of said machine module and said media supply unit being arranged on an opposite, second side of said machine module; and a valve manifold provided on an upper side of at least one of said machine modules for introducing product or treatment medium.

2. The linear filling machine according to claim 1, wherein said at least one media supply unit is a pneumatic supply unit.

3. The linear filling machine according to claim 2, wherein said machine modules are exchangeably coupled to one another and are connected for controlling and for operation to a central or actuation unit, wherein said electric supply units of all of said machine modules are arranged on a first side of the linear filling machine, extending along the conveying path, and said pneumatic supply units of all of said machine modules are arranged along an opposite, second side of the linear filling machine.

4. The linear filling machine according to claim 2, further comprising a treatment and function device arranged in an interior of said machine module, at least one electric distributor line connecting said treatment and function device to said electric supply unit and/or at least one pneumatic distributor line connecting said treatment and function device to said pneumatic supply unit.

5. The linear filling machine according to claim 2, wherein each of said machine modules comprises a module frame, said module frame having at least one vertical carrier column arranged on the first side of said machine module, at least one vertical carrier column arranged on the second side of said machine module, and at least one horizontal carrier spar extending along the first side and a horizontal carrier spar extending along the second side.

6. The linear filling machine according to claim 5, wherein:

said at least one vertical carrier column of the first side is configured for receiving and guiding an electric distributor line, at least in sections, and said electric distributor line is received and guided, at least in sections, in said vertical carrier column of the first side; and/or said at least one vertical carrier column of the second side is configured for receiving and guiding a pneumatic distributor line, at least in sections, and said pneumatic distributor line is received and guided, at least in sections, in said vertical carrier column of the second side.

7. The linear filling machine according to claim 6, wherein said vertical carrier columns are tubular columns.

8. The linear filling machine according to claim 6, wherein said vertical carrier columns are quadrilateral tubes.

9. The linear filling machine according to claim 6, wherein at least one of said electric distributor line or said pneumatic distributor line is guided at least in sections in a respective said vertical carrier column that is closest to a corresponding connection of said treatment and function device and, exiting from said vertical carrier column, is connected to the corresponding connection.

10. The linear filling machine according to claim 6, wherein at least one of said electric distributor line or said pneumatic distributor line is received and guided in said vertical carrier column such that the respective said distributor line runs freely on a shortest possible path through an interior of said machine module towards, and as far as, a connection of said treatment and function device.

11. The linear filling machine according to claim 6, wherein at least one of said electric distributor line or said pneumatic distributor line is laid with respective length sections that run linearly connecting to one another at right angles.

12. The linear filling machine according to claim 5, wherein said horizontal carrier spar of the first side forms an electric main channel configured for, at least partially, receiving and guiding said electric supply unit.

13. The linear filling machine according to claim 5, wherein said horizontal carrier spar of the second side forms a pneumatic main channel configured for, at least partially, receiving and guiding said pneumatic supply unit.

14. The linear filling machine according to claim 5, wherein each machine module comprises at least one tubular longitudinal main channel body extending along the conveying direction for at least partially receiving said electric supply unit or said pneumatic supply unit, and wherein said main channel body is carried by said horizontal carrier spars.

15. The linear filling machine according to claim 1, which comprises further machine sections formed as further machine modules.

16. The linear filling machine according to claim 15, wherein said further machine modules include at least one machine module being a closing device.

17. A machine module for a linear filling machine, the machine module forming an independent function unit being at least one of a treatment station for a treatment of containers or a filling station for filling containers, the machine module comprising:

an inlet end and an opposing outlet end, and at least one of said inlet end or said outlet end being a coupling section for a functional connection of a further machine module, and said coupling section being configured for unhindered onward transport of the containers over said coupling section;

at least one electric supply unit and at least one media supply unit;

said electric supply unit and said media supply unit being arranged spatially separate from one another;

said electric supply unit being arranged on a first side of said machine module and said media supply unit being arranged on an opposite second side of the machine module; and a valve manifold being disposed on an upper side of said machine module.

18. The machine module according to claim 17, wherein said at least one media supply unit is a pneumatic supply unit.

* * * * *